United States Patent Office
2,888,459
Patented May 26, 1959

2,888,459

3-METHANESULPHONYL PHENTHIAZINE

Robert Michel Jacob, Ablon-sur-Seine, and Gilbert Louis Regnier, Paris, France, assignors to Societe des Usines Chimiques Rhone-Poulenc, Paris, France, a French body corporate No Drawing. Application April 5, 1957
Serial No. 650,833

Claims priority, application France April 7, 1956

1 Claim. (Cl. 260—243)

This invention relates to a new derivative of phenthiazine.

It is the object of this invention to provide a new phenthiazine derivative of value as an intermediate for the production of therapeutically important N-aminoalkyl-phenthiazines.

The new phenthiazine derivative of the present invention is 3-methanesulphonylphenthiazine (Beilstein nomenclature).

The new compound may be prepared by heating a mixture of 3-methanesulphonyldiphenylamine and sulphur. The reaction is conveniently carried out at a temperature between about 150° and 250° C., preferably in an atmosphere of nitrogen and in the presence of a small quantity of iodine as catalyst. The 1- and 3-isomers which are formed simultaneously are separated by known methods, for example as described in Example I hereinafter.

3-methanesulphonylphenthiazine may also be obtained, without the complication resulting from formation of the 1-substituted isomer, by bringing about cyclisation of a diphenyl sulphide of the formula:

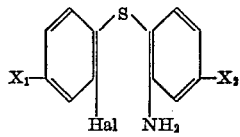

(wherein Hal represents a halogen atom such as chlorine or bromine, and one of the groups $X_1$ and $X_2$ represents a methanesulphonyl group and the other a hydrogen atom) in an anhydrous solvent at elevated temperature in the presence of an acid-binding agent. Preferred solvents are the N-substituted amides of fatty acids containing not more than 3 carbon atoms, e.g. dimethylformamide and N-methylacetamide, of which the former is preferred. Other suitable solvents include aromatic tertiary bases such as dimethylaniline. The cyclisation is conveniently brought about by refluxing the reaction mixture. As the acid-binding agent, it is preferred to employ potassium carbonate or sodium carbonate; however, other agents such as sodium hydroxide can also be used. Under some conditions (such as when an alkali carbonate is employed) the reaction can be accelerated by means of a dehydrohalogenation catalyst such as copper powder.

3-methanesulphonylphenthiazine is convertible, by the application of known methods, into 3-methanesulphonyl-N-aminoalkyl-phenthiazines of the general formula:

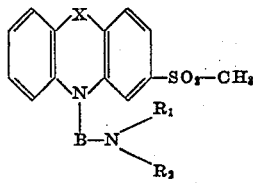

(wherein X represents a sulphur atom or an SO or $SO_2$ group, $R_1$ and $R_2$ are the same or different and either each represents a lower alkyl group or one of $R_1$ and $R_2$ represents a hydrogen atom and the other represents a lower alkyl group or $R_1$ and $R_2$ together with the adjacent nitrogen atom collectively represent a heterocyclic group, and B represents a straight or branched chain divalent aliphatic hydrocarbon group containing two to five carbon atoms unsubstituted or substituted by a group

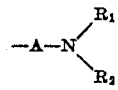

wherein A represents a single bond or a methylene group and $R_1$ and $R_2$ are as hereinbefore defined), which compounds have therapeutic utility; in particular as neuroleptics, potentiators of general anaesthetics, analgesics and anti-serotonin activity, and as anti-emetics.

The invention is illustrated by the following examples in which the melting points have been determined on the Kofler block.

Example I

An intimate mixture of 3-methanesulphonyldiphenylamine (62 g.), M.P. 109° C., sulphur (16 g.) and a few milligrammes of iodine is heated progressively in nitrogen for 5 hours from 130 to 235° C. until evolution of hydrogen sulphide ceases. When the reaction is finished, the temperature of the mixture is lowered to 180° C. and the contents of the flask poured into benzene (2.5 litres) at 60° C. The solution is then left to reach room temperature and a brown oil separates out. The benzene solution is decanted, filtered through an alkaline alumina column and the adsorbed products are eluted successively with benzene and mixtures of benzene and ethyl acetate. By evaporation of the eluates of benzene with 10% ethyl acetate a product, M.P. 144° C., is obtained which is 1-methanesulphonylphenthiazine. By evaporation of the eluates of benzene with 25% ethyl acetate a product is obtained, M.P. 164° C., which is 3-methanesulphonylphenthiazine.

The initial 3-methanesulphonyldiphenylamine may be obtained by decarboxylation of 2-carboxy-3'-methanesulphonyldiphenylamine, M.P. 185° C., itself obtained by the condensation of 3-methanesulphonylaniline with 2-chlorobenzoic acid.

Example II

2 - bromo - 2' - amino - 4' - methanesulphonyldiphenyl sulphide (500 g.), M.P. 128–129° C., dissolved in dimethylformamide (3750 cc.) is boiled for 12 hours in the presence of anhydrous potassium carbonate (210 g.) and copper powder (18.7 g.). When the reaction is finished, dimethylformamide (2740 cc.) is distilled off under reduced pressure and the residue obtained is then filtered off. The filtrate is then poured into water (4 litres). Crude 3-methanesulphonylphenthiazine (395 g.) is thus obtained which is purified by dissolving in benzene and filtration through an alkaline alumina column. After successive elutions with benzene and a mixture of benzene and ethyl acetate followed by evaporation of the benzene-ethyl acetate mixture, 3-methanesulphonylphenthiazine (246 g.), M.P. 164° C., is finally obtained.

The initial 2-bromo-2'-amino-4'-methanesulphonyldiphenyl sulphide may be obtained by reduction with iron and acetic acid of 2-bromo-2'-nitro-4'-methanesulphonyldiphenyl sulphide, M.P. 159° C., itself obtained by decomposition in the presence of cuprous bromide of the diazonium salt of 2-amino-2'-nitro-4'-methanesulphonyldiphenyl sulphide, M.P. 148° C., prepared by the condensation of 2-aminothiophenol with 3-nitro-4-chlorophenylmethyl sulphone, M.P. 124° C., obtained by the nitration and oxidation of 4-chlorothioanisole.

We claim:
The compound of the formula:
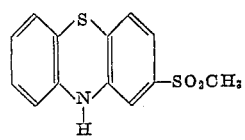
References Cited in the file of this patent
UNITED STATES PATENTS
| | | | |
|---|---|---|---|
| | 2,272,498 | Zerweck et al. | Feb. 10, 1942 |
| 5 | 2,534,237 | Cusic | Dec. 19, 1950 |
| | 2,789,978 | Rath | Apr. 23, 1957 |